Dec. 19, 1939.                H. FISCHER                2,183,961
         METHOD OF MANUFACTURING MULTILAYER HOLLOW GLASS BODIES
                        Filed Nov. 3, 1936
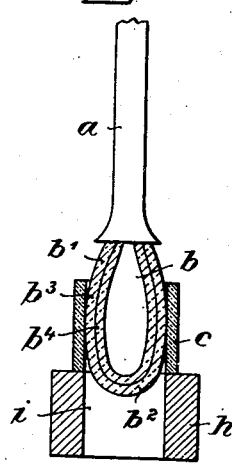
Fig.1.
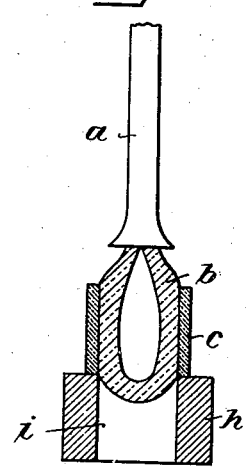
Fig.2.
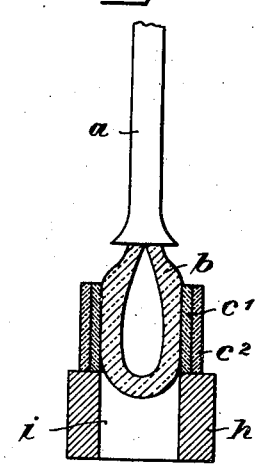
Fig.3.
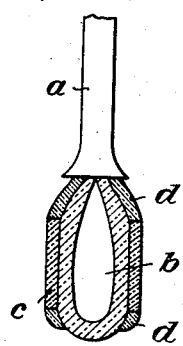
Fig.4.
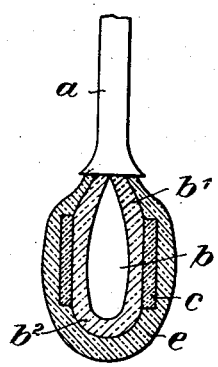
Fig.5.
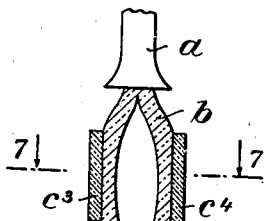
Fig.6.
Fig.7.
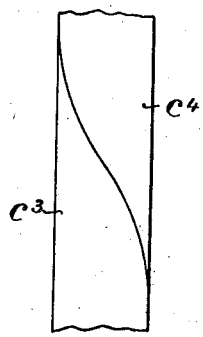
Fig.8.
Inventor:
Hellmuth Fischer
by Franz Reichhold
            Attorney.

Patented Dec. 19, 1939

2,183,961

UNITED STATES PATENT OFFICE 2,183,961

METHOD OF MANUFACTURING MULTI-LAYER HOLLOW GLASS BODIES

Hellmuth Fischer, Ilmenau, Germany

Application November 3, 1936, Serial No. 108,957
In Germany February 20, 1936

2 Claims. (Cl. 49—83)

My invention relates to improvements in the method of manufacturing multilayer hollow glass bodies, and more particularly in the method of manufacturing tubes the walls of which are composed of two or more layers of glass of different character. One of the objects of the improvements is to provide hollow glass bodies, and more particularly glass pipes, in which the different layers of the wall have the desired thickness, and with this object in view my invention consists in placing a solid tubular body or bodies of glass from which the superposed layer or layers are to be made around the gather of glass made by means of the glass blowpipe, fusing the said gather to the tubular body or bodies, reheating the body or the bodies up to the plastic state and thereafter continuing the shaping of the glass body, for example by drawing the blank thus produced into a pipe. In this method the thickness of the wall of the said tubular body is made according to the desired thickness of the layer to be produced on the finished article.

Another object of the improvements is to reduce the cost of the manufacture of the glass body, and with this object in view I place the said tubular body or bodies from which the superposed layer or layers are to be produced only around the median part of the said gather of glass, leaving the upper and lower portions of the said gather bare. Thereby I avoid the loss of valuable glass which is unavoidable when the coating of the gather extends all over the length thereof.

Other objects of the improvements will appear from the following description.

For the purpose of explaining the invention several examples embodying the same have been illustrated in the accompanying drawing in which the same reference characters have been used in all the views to indicate corresponding parts. In said drawing, Fig. 1 is a diagrammatical sectional elevation illustrating the manner of combining the gather of glass made by means of a glass blowpipe with a tubular body of glass placed around the same, Fig. 2 is a similar sectional elevation showing the gather of glass and the tubular body fused together, Fig. 3 is a sectional elevation similar to the one illustrated in Fig. 2 and showing a modification in which a plurality of tubular bodies of glass are combined with the gather, Fig. 4 is a sectional elevation showing a gather of glass having a tubular body fused around the same, the upper and lower portions of the said gather having coatings of glass of minor value, Fig. 5 is a similar sectional elevation showing a gather of glass and the tubular body fused thereto coated with a suitable protective glass, Fig. 6 is a sectional elevation showing the gather of glass and a tubular body made in sections of glass of different character, Fig. 7 is a sectional elevation taken on the line 7—7 of Fig. 6, and Fig. 8 is a fragmentary elevation showing a part of a pipe made from the blank shown in Figs. 6 and 7, the said blank being twisted in the course of the drawing of the pipe around its axis.

Referring at first to Figs. 1 and 2, the hollow body of glass such as a glass pipe is manufactured as follows: By means of a glass blowpipe $a$, a gather of glass is taken which is blown into the shape $b$, and the said gather $b$ is brought within a solid tubular body of glass $c$ of a suitable composition, the inner diameter of the body $c$ being slightly larger than the outer diameter of the gather $b$. The tubular body $c$ may be taken from a supply of annular bodies made beforehand by breaking a tubular body of a suitable length into pieces of the desired length, in which case the said pieces are first heated to a temperature slightly below the softening point of the glass. The tubular bodies $c$ may also be individually made in a plastic state on a suitable press in which case they may be combined with the gather without being further heated. The tubular body $c$ is placed on a suitable support $h$ which, as shown, has a a cavity $i$. After the bodies $b$ and $c$ have thus been assembled the gather $b$ is expanded by blowing into the shape shown in Fig. 2, whereby it is fused to the body $c$. Now the assembled bodies $b$ and $c$ are further heated for bringing the tubular body $c$ into plastic state, and thereafter blowing is further continued while the combined body $b$, $c$ is drawn out into the desired shape, for example into a pipe. Preferably, before or while thus drawing out the body $b$, $c$ the upper and lower portion of the gather which is attached to the blowpipe $a$ are cooled. After the pipe has thus been drawn out, the upper and lower sections thereof which are made from the upper and lower sections $b_1$ and $b_2$ located respectively above and below the tubular body $c$ are cut off.

From this method of the manufacture it will be understood, first, that the outer layer of the pipe made from the tubular body $c$ has exactly the desired thickness, and that the thickness is uniform all over the length of the pipe. Further, it will be understood that the loss of valuable coating material c is reduced to a minimum, because only the ends of the pipe which are made from portions $b_1$ and $b_2$ of the gather are cut off.

It will be understood that the gather $b$ may be composed of two layers $b_3$ and $b_4$ of glass of different character, which are made in the usual way by first blowing the gather $b_4$, dipping the same into a crucible containing glass of a character different from that of the gather $b_4$, and thereafter continuing the blowing of the gather.

In Fig. 3 I have shown a modification in which two tubular bodies $c_1$ and $c_2$ are applied to the gather $b$. The bodies $c_1$ and $c_2$ may be successively applied to the gather $b$ by first applying and fusing the inner body $c_1$ to the said gather, heating the blank and thereafter applying and fusing the second layer $c_2$ thereto. In a modification at first the tubular bodies $c_1$ and $c_2$ are placed one within the other and simultaneously applied to the gather $b$.

The drawing out of the glass requires some attention of the glass blower by reason of the different heat conditions of the comparatively thick body composed of the tubular bodies $c$ or $c_1$, $c_2$ and the inner portion of the gather $b$ on the one hand, and of the comparatively thin portions of the gather $b$ located above and below the said tubular bodies, and for this reason I prefer to apply coatings $d$ to the said upper and lower portions, as is shown in Fig. 4, the said coatings $d$, $d$ being preferably made from a less expensive glass. The layers $d$, $d$ are applied in a molten state, and before blowing or drawing of the blank is continued, they are cooled by means of air or water to a temperature equal to or below that of the median part of the blank. After the blank has been drawn out into a pipe the ends which are made from the upper and lower portions of the gather $b$ and the coatings $d$ are cut off.

In Fig. 5 I have shown a modification in which the blank composed of the gather $b$ and one or more tubular bodies $c$ is dipped into molten glass for providing a protective coating $e$ thereon. Preferably, the heat conditions of the blank thus produced are made uniform by cooling the upper and lower portions of the blank. For example the upper and lower portions $b_1$ and $b_2$ of the gather $b$ may be cooled after the cylindrical body $c$ has been applied, and before the coating $e$ has been produced. In a modification of the method I cool the upper and lower portions after the coating $e$ has been applied.

In another modification I use both cooling methods, the upper and lower portions $b_1$ and $b_2$ being cooled first before the coating $e$ has been applied, and thereafter I cool the upper and lower portions of the blank after the coating has been applied.

After the blank has thus been composed of the gather $b$, the ring $c$ and the coating $e$ it is reheated and drawn into a pipe, whereupon the ends are cut off.

In Figs. 6 to 8 I have shown another modification in which the solid tubular body of glass is composed of two sections $c_3$ and $c_4$ wihch are united at their meeting edges $f$ and fixed to the gather $b$ in the manner described above. The sections $c_3$, $c_4$ may consist of two kinds of glass different in colour or in the degree of opalescence. While the blank $b$, $c_3$, $c_4$ is drawn into a tube it may be twisted around its axis, as is indicated in Fig. 8.

The method described herein may be used for manufacturing composite pipes composed of several superposed layers which are different in character, for example the so called two-ply- or three-ply-opal tubing. Such tubing is for example used for illuminating purposes. Thus filament tubes and luminous electrical discharge tubes may be manufactured from such tubing. In the case of the filament tubes the source of light is an incandescent filament arranged in the evacuated tube in axial direction. In the luminous electrical discharge tube light is emitted by one or more gases and/or one or more metal vapors under the influence of the electrical current.

Thus I make composite pipes in which one or more of the layers consist of opal glass or of coloured glass, or in which one or more layers consist of opal glass and one or more other layers of coloured glass. In such glasses my improved method is particularly valuable because the intensity of the absorption of the coloured glass or glasses or the dispersion of the light by the opal glass is exactly as desired, so that the desired luminous effect may be obtained. Further, the method is important because it involves a considerable saving of the expensive clear or opal glass from which the outer layer or layers are made.

In the manufacture of the composite pipe the gather which in the finished pipe forms the inner layer may be made from a glass of any composition, and it may be a clear glass, or a coloured glass, or an opal glass. Further, it may be a luminescent or a non-luminescent glass. Further, it may be composed of one or more layers of superposed glasses. If it is composed of luminescent glass, the latter is excited to luminescence preferably by the radiation of the gas and/or metal vapor within the tube.

In combining the glasses in the manner described care should be taken that the coefficient of expansion by heat of all the glasses is the same and that also the coefficient of expansion of the less expensive glass $d$ is the same as that of the other glasses.

I claim:

1. The herein described method of manufacturing composite tubular bodies of glass, which consists in making a gather on a blowpipe, applying to the median portion of the gather a coating of a glass of higher grade leaving the end portions bare of said coating of higher grade glass, applying low grade glass to the projecting ends of the gather, drawing the blank thus produced into a pipe, and removing the whole of the end portions of said pipe which are bare of the coating of glass of higher grade.

2. The method herein described of forming a stratified glass tube with conservation of the glass of one stratum, which consists in blowing within a tubular blank of the glass to be conserved a gather of glass of the inner stratum and in so doing forming a blank that is double-walled intermediately, between its two single-walled ends, bringing the blank to uniform plastic condition and drawing it to a tube while subject to pneumatic tension from within and simultaneously imposing upon the end portions of the blank restraint against response to such internal tension, and finally removing the end portions.

HELLMUTH FISCHER.